United States Patent
Nishimura et al.

(10) Patent No.: US 7,108,884 B2
(45) Date of Patent: Sep. 19, 2006

(54) PROCESS FOR PRODUCING CYSTEINYLGLYCINE-ENRICHED FOOD MATERIAL AND PROCESS FOR PRODUCING FLAVOR-ENHANCING AGENT

(75) Inventors: Yasushi Nishimura, Kanagawa (JP); Yuji Kato, Kanagawa (JP); Masanori Kohmura, Kanagawa (JP); Yoichi Ueda, Kanagawa (JP)

(73) Assignee: Ajinomoto Co., Inc., Tokyo (JP)

( * ) Notice: Subject to any disclaimer, the term of this patent is extended or adjusted under 35 U.S.C. 154(b) by 565 days.

(21) Appl. No.: 10/239,210

(22) PCT Filed: Mar. 26, 2001

(86) PCT No.: PCT/JP01/02418

§ 371 (c)(1),
(2), (4) Date: Jan. 2, 2003

(87) PCT Pub. No.: WO01/87088

PCT Pub. Date: Nov. 22, 2001

(65) Prior Publication Data

US 2003/0138521 A1    Jul. 24, 2003

(30) Foreign Application Priority Data

May 17, 2000    (JP)    .............................. 2000-144439

(51) Int. Cl.
*A23L 1/22*    (2006.01)
*A23L 1/28*    (2006.01)

(52) U.S. Cl. ........................ 426/533; 426/62; 426/534; 426/535; 426/650

(58) Field of Classification Search .................. 426/61, 426/62, 533, 534, 535, 650
See application file for complete search history.

(56) References Cited

FOREIGN PATENT DOCUMENTS

| EP | 1142493 | * 10/2001 |
|----|---------|-----------|
| JP | 61-239862 | 10/1986 |
| JP | 1-281057 | 11/1989 |

* cited by examiner

*Primary Examiner*—Leslie Wong
(74) *Attorney, Agent, or Firm*—Oblon, Spivak, McClelland, Maier & Neustadt, P.C.

(57) ABSTRACT

Disclosed in this application are a method for producing a food material containing cysteinylglycine at a high content, which comprises the step of (a) maintaining a starting food material containing glutathione in a ratio of 1% by weight or more based on the solid content at a temperature of 50 to 120° C. and a pH of 1 to 7 in the presence of water, or (b) treating the food material with a γ-glutamylpeptide hydrolase at a temperature of 15 to 70° C. and a pH of 3 to 9 in the presence of water, whereby a food material rich in cysteinylglycine is allowed to result, as well as a method for producing a food flavor (or savor) enhancer, which comprises the steps of (a) adding a sugar to cysteinylglycine or a food material containing cysteinylglycine in a ratio of 0.5% by weight or more based on the solid content, and (b) heating the resulting mixture at a temperature of 70 to 180° C. for a period of 10 to 180 minutes in the presence of water, whereby a natural food material containing crysteinylglycine at a high content, and therefore, a food savor enhancer rich in cysteinylglycine, can be easily provided.

16 Claims, 3 Drawing Sheets

Change with time of cysteinylglycine resulting from transglutaminase-treating of glutathione Change with time of cysteinylglycine resulting from transglutaminase-treating of highly glutathione-containing yeast extract Change with time of cysteinylglycine resulting from heat-treating of highly glutathione-containing yeast extract

PROCESS FOR PRODUCING CYSTEINYLGLYCINE-ENRICHED FOOD MATERIAL AND PROCESS FOR PRODUCING FLAVOR-ENHANCING AGENT

This application is a 371 of PCT/JPO1/02418 filed Mar. 26, 2001.

TECHNICAL FIELD

The present invention relates to a food material containing cysteinylglycine at a high content, and to a food flavor enhancer, i.e., a food savor enhancer. In greater detail, it relates to a method for producing a food material containing cysteinylglycine at a high content, which comprises the step of (a) maintaining a starting food material containing glutathione in a ratio of 1% by weight or more based on the solid content at a temperature of 50 to 120° C. and a pH of 1 to 7 in the presence of water, or (b) treating the food material with a γ-glutamylpeptide hydrolase at a temperature of 15 to 70° C. and a pH of 3 to 9 in the presence of water, whereby a food material rich in cysteinylglycine is allowed to result, and to a method for producing a food flavor enhancer, which comprises the steps of (a) adding a sugar to cysteinylglycine or a food material containing cysteinylglycine in a ratio of 0.5% by weight or more based on the solid content, and (b) heating the resulting mixture at a temperature of 70 to 180° C. for a period of 10 to 180 minutes in the presence of water.

Incidentally, in the present specification, the term "glutathione" includes the oxidized form (in the broad sense), and the term "cysteinylglycine" also includes the oxidized form (in the broad sense), unless otherwise construed in the context.

BACKGROUND ART

Recently, the demand for processed foods having a meat-like flavor has been increased with westernization and diversification of the eating habits in Japan. Particularly, in the production of soups, processed meat products such as ham, sausage and the like, and cooked foods such as hamburger and the like, there is an increasing demand for good tasting and inexpensive meat flavor.

Heretofore, as a means for imparting meat flavor to foods without using meat itself or for the purpose of general improvement of the flavor or savor of foods is used a sulfur-containing compound such as glutathione, cysteine, glutamylcysteine or the like. For example, it has been already known in, e.g., Japanese Patent Application Laid-Open (Kokai) Nos. 66069/'92, 91762/'92 etc., that food materials obtainable by heating glutathione or γ-glutamylcysteine, or a yeast extract or the like containing glutathione or γ-glutamylcysteine in the presence of a sugar, are effective for enhancing food savor.

In greater detail, the former (Japanese Patent Application Laid-Open (Kokai) No. 66069/'92) describes as follows: "as a result of their extensive studies for obtaining more preferable meat flavor seasonings, the present inventors have found that a roast meat flavor-like seasoning having a good quality and excellent stability without the afore-mentioned unpleasant odor and taste derived from yeast, can be obtained by adding a sugar and an amino acid, if required, to a yeast extract containing a sulfur-containing compound such as glutathione, cysteine, glutamylcysteine or the like in an amount of 2 to 20% by weight (solid content concentration), followed by heating the resulting mixture in the absence of fat" (in the beginning of the "Means for solving the Problems" section of the patent document) and, based on such findings, they have accomplished "a method for producing a seasoning which comprises steps of adding a sugar and an amino acid, if required, to a yeast extract containing a sulfur-containing compound such as glutathione, cysteine, glutamylcysteine or the like in a predetermined amount (2 to 20% by weight of the extract), and heating then the mixture in the absence of fat at 70 to 180° C. for 10 to 180 minutes" (in the "Claims" section of the patent document).

The latter (Japanese Patent Application Laid-Open (Kokai) No. 91762/'92) describes as follows: "a variety of conventional meat flavors have been known, but they are all have a different quality from the aroma of roasted natural meat, and therefore, a flavor imparting agent having a closer quality to roasted natural meat flavor has been wanted." (in the "Problems to be Solved by the Invention" section of the patent document); and in the situation, "as a result of studies of a flavor of heated and browned various amino acids and sugars for the purpose of solving these problems, the present inventors have found that a flavor composition having a pleasant roasted meat aroma or flavor can be produced by adding a sugar to γ-glutamylcysteine and dissolving the resulting mixture in water, followed by subjecting the solution to a heat reaction by heating at 70 to 180° C. for 10 to 180 minutes, and thus accomplished the present invention" (in the "Means for Solving the problems" section of the patent document). Thus, it discloses "a method for producing a flavor composition comprising the steps of adding a sugar to γ-glutamylcysteine and heating the resulting mixture at 70 to 180° C. for 10 to 180 minutes".

By either method, however, meat flavor is indeed increased, but problems of a burnt odor, a chemical odor and the like are pointed out.

In addition, there are problems that the seasonings produced by the above methods have an unpleasant, strongly pungent taste owing to cysteine or γ-glutamylcysteine, and the seasonings produced by using glutathione have an unclear taste.

On the other hand, cysteinylglycine is known as one of sulfur-containing compounds. Cysteinylglycine is a dipeptide obtainable by combination of cysteine and glycine through peptide linkage, and is considered to be a possible pleasant meat flavor enhancing material similar to cysteine and glutathione. However, as methods for producing cysteinylglycine, indeed, a peptide synthesis has been known, but a producing method from a natural material has hitherto not been known. In the case that cysteinylglycine is to be used for the above purpose, there is a strong demand for a natural food material containing the same at a high content, but such a natural food material containing cysteinylglycine at a high content has hitherto not been known.

DISCLOSURE OF THE INVENTION

Under the background of the background art described above, it is an object of the present invention to provide a food material containing cysteinylglycine at a high content, and further a food savor enhancer containing cysteinylglycine at a high content, having only weak burnt odor or smell and chemical odor, exhibiting no above-described problems in the taste, and enhancing savor such as good meat flavor and the like suitable for foods and drinks.

As a result of their extensive and intensive studies for achieving the afore-mentioned object, the present inventors have found that glutathione when heated at a specific pH and temperature decomposes into cycteinylglycine and PCA (pyrrolidonecarboxylic acid) to afford cysteinylglycine in high yields as a whole, and that glutathione when treated with a γ-glutamylpeptide hydrolase decomposes into cycteinylglycine and glutamic acid to afford cysteinylglycine in high yields as a whole. Furthermore, they have found that the heating of yeast cells or yeast extract containing glutathione in an amount of 1% by weight or more in a hydrous state or the treating of such yeast cells or yeast extract with a γ-glutamylpeptide hydrolase affords a cysteinylglycine-highly containing yeast extract, i.e., a yeast extract rich in cysteinylglycine, and that a food savor enhancer weak in burnt odor and chemical odor and having a pleasant taste quality, can be obtained by adding a sugar to cysteinylglycine or a food material containing cysteinyiglycine in a ratio of 0.5% by weight or more based on the solid content, dissolving the resulting mixture in water, and then heating (reacting) the resulting solution at a temperature of 70 to 180° C. for 10 to 180 minutes. Based on these findings, the present invention has been accomplished.

Accordingly, the present invention relates to a method for producing a food material containing cysteinylglycine at a high content, which comprises the step of (a) maintaining a starting food material containing glutathione in a ratio of 1% by weight or more based on the solid content at a temperature of 50 to 120° C. and a pH of 1 to 7 in the presence of water, or (b) treating the food material with a γ-glutamylpeptide hydrolase (i.e., allowing a γ-glutamylpeptide hydrolase to act on the food material) at a temperature of 15 to 70° C. and a pH of 3 to 9 in the presence of water, whereby a food material rich in cysteinylglycine is allowed to result, and to such a method wherein the said starting food material is a yeast extract or a yeast cell which is a natural food material, as well as to a method for producing a food savor or flavor enhancer, which comprises the steps of (a) adding a sugar to cysteinylglycine or a food material containing cysteinylglycine in a ratio of 0.5% by weight or more based on the solid content, and (b) heating the resulting mixture at a temperature of 70 to 180° C. for a period of 10 to 180 minutes in the presence of water.

Hereinafter will be explained the present invention in greater detail.

The natural food material which is a raw material according to the method for producing the food material containing cysteinylglycine at a high content of the present invention, is a natural food material containing glutathione at a high content, i.e., in a ratio of 1% by weight or more, preferably 4% by weight or more based on the solid content. A natural food material containing glutathione at a content of 1% or less is not preferred, because a savor enhancer produced therefrom exhibits only unsatisfactory savor enhancing effect when such material is used in the production of the food savor enhancer of the present invention which will be explained below.

As such natural food materials, there may be mentioned yeast cells and yeast extracts containing glutathione in a ratio of 1% by weight or more, preferably 2% by weight or more, and more preferably 4% by weight or more based on the solid content. Incidentally, such yeast cells containing glutathione at a high content can be obtained by modifying the method of culturing yeasts. Moreover, such yeast extracts can be prepared by extraction of such yeast cells or self-digestion thereof, or by supplementing with glutathione, yeast extracts whose glutathione content is less than the above predetermined amount.

According to the present invention, heating such natural food material at 50 to 120° C. at a pH range of acidic to neutral, i.e., pH 1 to 7 in the presence of water results in decomposition of glutathione within 3 to 300 minutes into cysteinylglycine and PCA. The amount of water present therein is determined in view of the operationability. For example, the amount may be from 1 to 100 parts by weight per 1 part by weight (dry basis) of the natural food material. The pH which is out of the above range is not preferred because of a smaller production of cysteinylglycine. Adjustment of the pH can be, needless to say, effected by an acid such as hydrochloric acid or the like, or a base such as sodium hydroxide or the like, which are acceptable for foods. Regarding the heating temperature, too low a temperature is not preferred because decomposition of glutathione proceeds only slowly, and too high a temperature is also not preferred because the cysteinylglycine once formed is decreased by side reactions. Regarding the heating time, too short a period is not preferred because of incomplete reaction, and too long a period is also not preferred because of the decrease of the cysteinylglycine once formed by side reactions.

In addition, a method of treatment with an enzyme may be mentioned for producing cysteinylglycine by decomposition of glutathione. Namely, when a food material containing glutathione is treated with an enzyme capable of hydrolyzing γ-glutamyl group, i.e., an enzyme capable of hydrolyzing γ-glutamyl group is allowed to act on a food material containing glutathione, in the presence of water at a pH of 3 to 9 and a temperature of 15 to 70° C., the glutathione is decomposed to form cysteinylglycine within 1 to 300 minutes. The amount of water present therein is determined in view of the operationability. For example, the amount may be from 1 to 100 parts by weight per 1 part by weight (dry basis) of the natural food material. The pH and temperature which are out of the above ranges are not preferred because the activity of the γ-glutamylpeptide hydrolase is lowered.

There exist many γ-glutamylpeptide hydrolase. In particular, industrially useful examples thereof include γ-glutamyltransferase, γ-glutamylcyclotransferase, glutaminase, and the like.

The cysteinylglycine-highly containing natural food material thus prepared may be put into distribution in suitable forms, for example, as it is, i.e., as a liquid, or as a paste after concentration, as a powder after drying, as granules, or the like.

Next, the method for producing a food savor enhancer, or a food flavor enhancer, of the present invention will be explained.

For example, the desired savor enhancer can be produced by adding a sugar to cysteinylglycine or a natural food material containing cysteinylglycine in a ratio of 0.5% by weight or more, preferably 1% by weight or more, and more preferably 2% by weight or more based on the solid content, followed by dissolving the mixture in water, and heating (for reaction) the resulting solution at a temperature of 70 to 180° C., whereby the desired savor enhancer results within 10 to 180 minutes. By the way, the molecular weight of cysteinylglycine is almost a half of the molecular weight of glutathione.

The food material which is a raw material in such method for producing a food savor enhancer, is a food material containing cysteinylglycine at such a high content, i.e., in a ratio of 0.5% by weight or more, preferably 1% by weight or more, and more preferably 2% by weight or more based on the solid content. The food material, needless to say, includes the food material produced by the method for producing a food material containing cysteinylglycine at a high content of the present invention explained in the above.

The material containing cysteinylglycine in an amount of 0.5% by weight or less is industrially impractical.

As such natural food materials, there may be mentioned yeast cells and yeast extracts containing cysteinylglycine in a ratio of 0.5% by weight or more based on the solid content. Incidentally, such yeast cells containing cysteinylglycine at a high content can be obtained by modifying the method of culturing yeasts. Moreover, such yeast extracts can be prepared by extraction of such yeast cells or self-digestion thereof, or by supplementing with cysteinylglycine, yeast extracts whose cysteinylglycine content is less than the above predetermined amount. This is the same as has been described above, in connection with the method for producing the food material containing cysteinylglycine at a high content of the present invention.

Examples of the sugar to be used according to the present invention include monosaccharides such as xylose, glucose, fructose, ribose, and the like, and disaccharides such as sucrose, maltose, and the like.

The amount of sugar to be added (amount to be used) is determined as a ratio to the cysteinylglycine, and is from 5 to 400 parts by weight thereto. The concentration of a mixture of cysteinylglycine and sugar dissolved in water is from 2 to 50%. At that time, a pleasant meat flavor can be also produced by adding optionally an amino acid such as sodium glutamate or a protein hydrolyzate, or a yeast extract to the heating reaction system. Needless to say, other sulfur-containing amino acids such as cysteine, glutathione and the like may be present in the reaction system.

The food savor enhancer thus prepared may be put into distribution in suitable forms, for example, as it is, i.e., as a liquid, or as a paste after concentration, as a powder after drying, as granules, or the like, as in the case of the food material containing cysteinylglycine at a high content.

BEST MODE FOR CARRYING OUT THE INVENTION

Hereinbelow, the present invention in more detail by reference to Test Example and Examples.

TEST EXAMPLE 1

The amount (increase and decrease, i.e., change with the passage of time) of the cysteinylglycine formed was examined when an aqueous solution of reduced-form glutathione having a concentration of 50 mmol at pH 7.0 was added with a glutaminase preparation "Glutaminase Daiwa" (specific activity: 3.0 mM/min/mg) manufactured by Daiwa Kasei K. K. in an amount of 1 mg/ml thereof and treated therewith at 37° C. for 3 hours, whereby the glutaminase was allowed to act on the glutathione. The results will be shown later in FIG. 1. In the figure, "GSH" represents the reduced-form glutathione, and "Total Cys-Gly" represents the cysteinylglycine.

Figure 1:
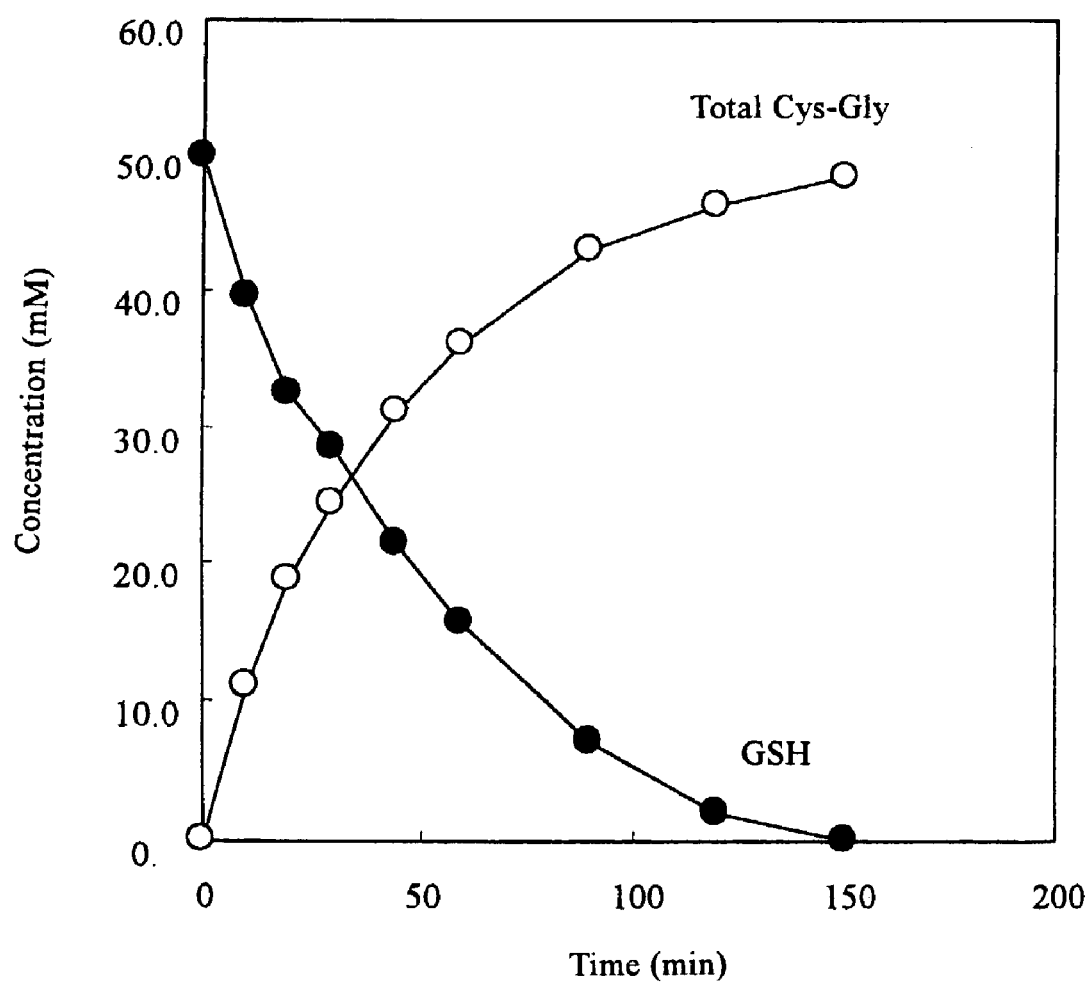
FIG. 1 shows the change with the passage of time in the amount of cysteinylglycine formed resulting from decomposition of reduced-form glutathione by the action of glutaminase at pH 7 (Test Example 1).

As can be understood from FIG. 1, cysteinylglycine is obtained from glutathione in high yields by the action of glutaminase.

EXAMPLE 1

Water was added to a yeast extract powder whose glutathione content was 8%, and the pH of the resulting mixture was adjusted to 7 with sodium hydroxide to prepare an aqueous solution of 10% concentration. To the solution was added the same glutaminase preparation as that used in Test Example 1 in an amount of 1 mg/ml of the solution. Then, the resulting mixture was incubated at 37° C. for 120 minutes, followed by freeze-drying, whereby a yeast extract powder having a 4.5% cysteinylglycine content was obtained.

Figure 2:
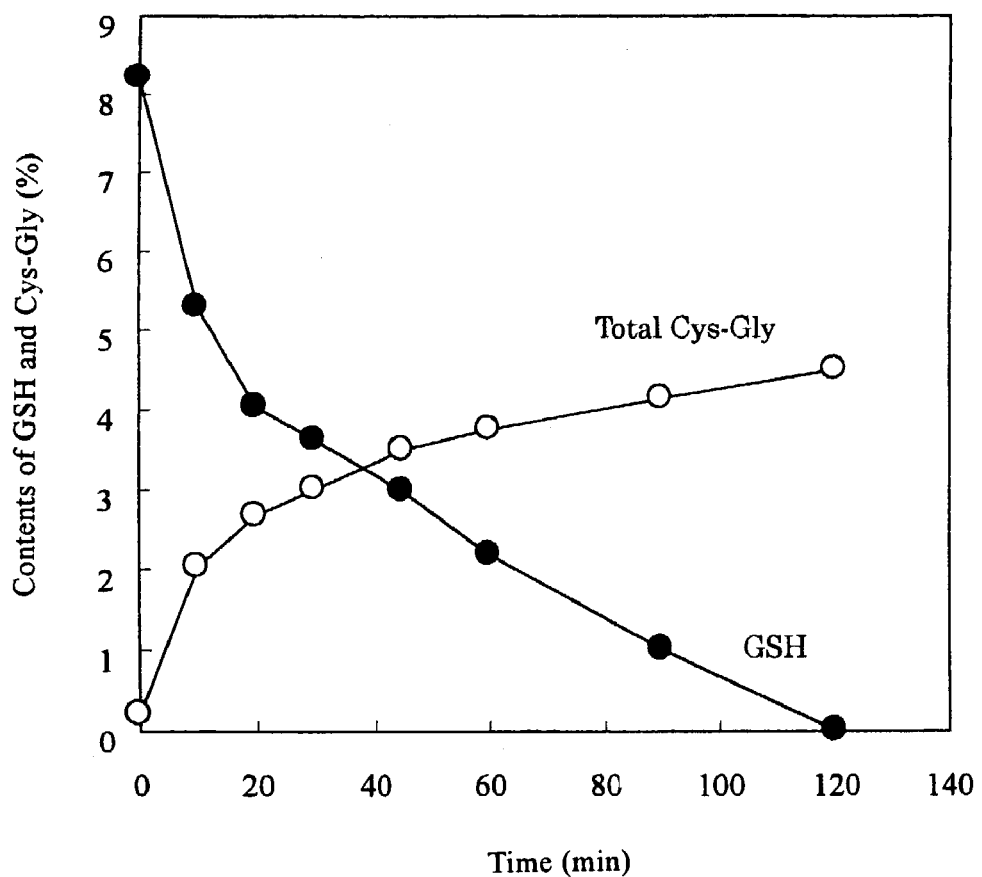
FIG. 2 shows the change with the passage of time in the amount of cysteinylglycine formed resulting from decomposition of reduced-form glutathione present in a highly glutathione-containing yeast extract by the action of glutaminase at pH 7 (Example 1).

The increase and decrease of the cysteinylglycine with the passage of time was measured during the incubation. The results will be shown later in FIG. 2. In the figure, the vertical axis represents the contents of the glutathione and the cysteinylglycine calculated based on the solid content, respectively.

Incidentally, when the yeast extract powder was used for the seasoning production, a seasoning exhibiting a pleasant roast meat flavor was obtained.

EXAMPLE 2

Water was added to a yeast extract powder whose glutathione content was 8%, and the pH of the resulting mixture was adjusted to 5 with hydrochloric acid to prepare an aqueous solution of 2% concentration. The solution was heated at 98° C. for 180 minutes and then freeze-dried to obtain a yeast extract powder having a 2.0% cysteinylglycine content.

Figure 3:
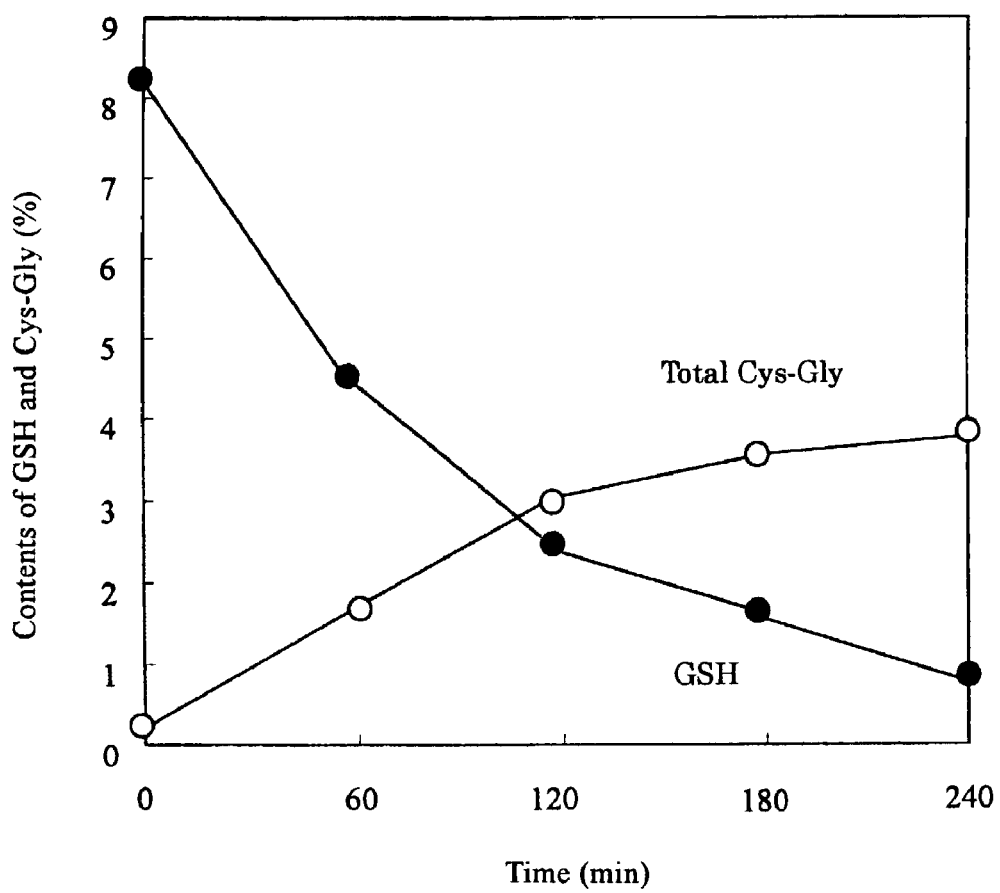
FIG. 3 shows the change with the passage of time in the amount of cysteinylglycine formed resulting from decomposition of reduced-form glutathione contained in a highly glutathione-containing yeast extract by heating (Example 2).

During the incubation, measurement was carried out as in Example 1, and the results will be shown later in FIG. 3.

Incidentally, when the yeast extract powder was used for the seasoning production, a seasoning having a pleasant roast meat flavor was obtained.

EXAMPLE 3

In 100 ml of water was dissolved 5 g of xylose. Into the solution was dissolved 1 g of one of cysteine, glutathione, and cysteinylglycine. The three, thus resulting solutions were heat-treated at 95° C. for 2 hours. Sensory evaluation on the flavor of each resulting solution was carried out by 15 panel persons. The results will be shown below in Table 1.

TABLE 1

|  | Cysteine | Glutathione | Cysteinylglycine |
|---|---|---|---|
| Strength of roast aroma | 4.6 | 4.4 | 4.5 |
| Preference of roast aroma | 3.2 | 4.1 | 4.9 |
| Strength of total aroma | 4.3 | 4.1 | 4.0 |
| Preference of total aroma | 3.4 | 4.3 | 4.9 |
| Strength of chemical odor | 4.9 | 4.1 | 1.0 |

TABLE 1-continued

|  | Cysteine | Glutathione | Cysteinylglycine |
|---|---|---|---|
| Strength of pungent odor | 4.9 | 4.9 | 1.5 |

Score  5: very strong or very pleasant
       4: strong or pleasant
       3: slightly strong or slightly pleasant
       2: slightly weak or slightly unpleasant
       1: weak or unpleasant
Average value at 5-step rating by 15 panel persons

EXAMPLE 4

In 100 ml of water was dissolved 5 g of xylose. To the solution was added a yeast extract containing glutathione at a high content (content of glutathione being 8%; referred to herein as Yeast extract (a)) or another yeast extract obtained by treating the yeast extract containing glutathione at a high content with 1 mg/ml of the glutaminase preparation at 37° C. for 2 hours (no glutathione was detected; content of cysteinylglycine being 4.5%; referred to herein as Yeast extract (b)). The two, thus obtained solutions were heat-treated at 95° C. for 2 hours. Sensory evaluation on the flavor of each resulting solution was carried out by 15 panel persons, as in Example 3. The results will be shown below in Table 2.

TABLE 2

|  | Yeast extract (a) | Yeast extract (b) |
|---|---|---|
| Strength of roast aroma | 4.4 | 4.4 |
| Preference of roast aroma | 4.1 | 4.8 |
| Strength of total aroma | 4.1 | 4.0 |
| Preference of total aroma | 4.2 | 4.9 |
| Strength of chemical odor | 3.9 | 1.0 |
| Strength of pungent odor | 4.9 | 1.5 |

Score  5: very strong or very pleasant
       4: strong or pleasant
       3: slightly strong or slightly pleasant
       2: slightly weak or slightly unpleasant
       1: weak or unpleasant
Average value at 5-step rating by 15 panel persons

EXAMPLE 5

Water was added to 15 g of a hydrolyzed vegetable protein (HVP) and 1.5 g of maltose to prepare an aqueous solution in an amount of 50 ml in total. Thereto was added 0.5 g of one of cysteine, glutathione, and cysteinylglycine. The three, thus resulting solutions were heated at 95° C. for 2 hours, followed by cooling on standing to room temperature, and then the pH thereof was adjusted to 5.5. Thereafter, sensory evaluation on the aroma, savor and taste of each resulting solution was carried out by 15 panel persons. The results will be shown below in Table 3.

TABLE 3

|  | Cysteine | Glutathione | Cysteinylglycine |
|---|---|---|---|
| Strength of roast aroma | 3.9 | 4.1 | 4.1 |
| Preference of roast aroma | 3.4 | 4.0 | 4.7 |
| Strength of total aroma | 3.8 | 3.7 | 3.6 |
| Preference of total aroma | 3.2 | 3.9 | 4.3 |
| Strength of chemical odor | 4.9 | 3.7 | 1.0 |
| Strength of pungent odor | 4.9 | 4.9 | 1.7 |
| Strength of meat flavor | 3.4 | 4.3 | 4.1 |
| Preference of meat flavor | 3.5 | 4.1 | 4.4 |
| Strength of total flavor | 4.1 | 3.6 | 3.9 |
| Preference of total flavor | 3.3 | 3.5 | 4.6 |
| Pungent taste | 4.9 | 4.6 | 1.3 |
| Unclearness of taste | 1.5 | 5.0 | 1.3 |
| Comprehensive evaluation | 3.6 | 4.2 | 4.8 |

Score  5: very strong or very pleasant
       4: strong or pleasant
       3: slightly strong or slightly pleasant
       2: slightly weak or slightly unpleasant
       1: weak or unpleasant
Average value at 5-step rating by 15 panel persons

EXAMPLE 6

In 100 ml of water was dissolved 5 g of xylose, and then 1 g of cysteinylglycine was dissolved. The resulting solution was heat-treated at 95° C. for 2 hours. The thus treated solution was concentrated and freeze-dried. The resulting dried product (inventive one) was added to a commercially available beef consomme soup in an amount of 0.05% relative to the solid content. Sensory evaluation by the paired comparison test was carried out by 15 panel persons, using a corresponding xylose-free product as the control. The results will be shown below in Table 4.

TABLE 4

|  | Inventive (persons) | Control (persons) |
|---|---|---|
| Strength of meat flavor | 15 | 0 |
| Preference of meat flavor | 15 | 0 |
| Strength of total flavor | 14 | 1 |
| Preference of total flavor | 14 | 1 |
| Comprehensive evaluation | 14 | 1 |

EXAMPLE 7

In 100 ml of water was dissolved 5 g of maltose. To the resulting solution was added a yeast extract containing glutathione at a high content (content of glutathione being 8%; referred to herein as Yeast extract (a)) or another yeast extract obtained by treating the yeast extract containing glutathione at a high content with 1 mg/ml of the glutaminase preparation (the same one as used in Test Example 1) at 37° C. for 2 hours (no glutathione was detected; content of cysteinylglycine being 4.5%; referred to herein as Yeast extract (b)). The two, thus resulting solutions were heat-treated at 95° C. for 2 hours. Each solution was concentrated and spray-dried to form powder. Thereafter, sensory evaluation on these dried products were carried out in connection with each system of (a) a commercially available beef consomme soup, (b) a curry sauce, and (c) a Japanese consomme soup. The results will be shown below in Table 5. Each dried product was added in amounts shown in the table based on the solid content, and sensory evaluation by the paired comparison test of Yeast extract (b) of the present invention was carried out by 15 panel persons as in Example 6, using Yeast extract (a) as the control. The results will be shown below in Table 5.

TABLE 5

| | (0.05% by weight added) | |
|---|---|---|
| (a) Beef consomme soup, | Inventive (persons) | Control (persons) |
| Strength of meat flavor | 8 | 7 |
| Preference of meat flavor | 12 | 3 |
| Strength of total flavor | 6 | 9 |
| Preference of total flavor | 12 | 3 |
| Preference of taste | 14 | 1 |
| Strength of taste | 15 | 0 |
| Comprehensive evaluation | 13 | 2 |

| | (0.1% by weight added) | |
|---|---|---|
| (b) Curry sauce, | Inventive (persons) | Control (persons) |
| Strength of meat flavor | 8 | 7 |
| Preference of meat flavor | 14 | 1 |
| Strength of total flavor | 7 | 8 |
| Preference of total flavor | 14 | 1 |
| Preference of taste | 15 | 0 |
| Strength of taste | 12 | 3 |
| Comprehensive evaluation | 15 | 0 |

| | (0.05% by weight added) | |
|---|---|---|
| (c) Japanese consomme soup | Inventive (persons) | Control (persons) |
| Strength of Japanese dashi stock flavor | 9 | 6 |
| Preference of Japanese dashi stock flavor | 15 | 0 |
| Strength of total flavor | 8 | 7 |
| Preference of total flavor | 14 | 1 |
| Preference of taste | 15 | 0 |
| Strength of taste | 15 | 0 |
| Comprehensive evaluation | 15 | 0 |

INDUSTRIAL APPLICABILITY

According to the present invention, a natural food material containing cysteinylglycine at a high content such as a yeast extract containing cysteinylglycine at a high content, useful for improving food flavors or the like, can be easily obtained.

Further, according to the present invention can be easily obtained a food savor enhancer exhibiting no problems such as strong burnt smell or odor or chemical smell or odor and unpleasant pungent odor or unclear taste in the taste quality, and enhancing food savor such as meat flavor and the like suitable for foods and drinks.

The invention claim is:

1. A method for producing a food material containing cysteinyiglycine at a high content, which comprises
   (a) maintaining a starting food material containing glutathione in a ratio of 1% by weight or more based on the solid content at a temperature of 50 to 120° C. and a pH of 1 to 7 in the presence of water, or
   (b) treating the food material with a γ-glutamylpeptide hydrolase at a temperature of 15 to 70° C. and a pH of 3 to 9 in the presence of water.

2. The method for producing a food material containing cysteinylglycine at a high content according to claim 1, wherein said γ-glutamylpeptide hydrolase is a member selected from the group consisting of γ-glutamyltransferase, γ-glutamylcyclotransferase, and glutaminase.

3. The method for producing a food material containing cysteinylglycine at a high content according to claim 1, wherein said starting food material is a yeast extract or a yeast cell which is a natural food material.

4. A method for producing a food flavor enhancer, which comprises
   (a) adding a sugar to cysteinylglycine or a food material containing cysteinylglycine in a ratio of 0.5% by weight or more based on the solid content, and
   (b) heating the resulting mixture at a temperature of 70 to 1 80° C. for a period of 10 to 180 minutes in the presence of water.

5. The method of claim 1, wherein said maintaining is with a starting food material containing glutathione in a ratio of 2% by weight or more based on the solid content.

6. The method of claim 1, wherein said maintaining is with a starting food material containing glutathione in a ratio of 4% by weight or more based on the solid content.

7. The method of claim 1, wherein said maintaining is for a period of time ranging from 3 to 300 minutes.

8. The method of claim 1, wherein in (a) said water is present in an amount ranging from 1 to 100 parts be weight per part by weight (dry basis) of the starting food material.

9. The method of claim 1, wherein said treating is for a period of time ranging from 1 to 300 minutes.

10. The method of claim 1, wherein in (b) said water is present in an amount ranging from 1 to 100 parts by weight per 1 part by weight (dry basis) of the starting food material.

11. The method of claim 4, wherein said adding is with a food material containing cysteinylglycine in a ratio of 1% by weight or more based on the solid content.

12. The method of claim 4, wherein said maintaining is with a starting food material containing glutathione in a ratio of 2% by weight or more based on the solid content.

13. The method of claim 4, wherein said food material is a yeast extract or a yeast cell.

14. The method of claim 4, wherein said sugar is selected from the group consisting of xylose, glucose, fructose, ribose, sucrose, and maltose.

15. The method of claim 4, wherein said sugar is added in a ratio of 5 to 400 parts by weight per 1 part by weight of the cysteinylglycine.

16. The method of claim 4, wherein the concentration of a mixture of sugar and cysteinylglycine dissolved in water ranges from 2 to 50%.

* * * * *